F. G. GALE AND P. W. SHAW.
TUBE WELDING MACHINE.
APPLICATION FILED AUG. 20, 1921.

1,434,885.

Patented Nov. 7, 1922.
9 SHEETS—SHEET 1.

Inventors.
Francis G. Gale
Percy W. Shaw
by Howard Smith & Tennant
Attys.

F. G. GALE AND P. W. SHAW.
TUBE WELDING MACHINE.
APPLICATION FILED AUG. 20, 1921.

1,434,885.

Patented Nov. 7, 1922.

Inventors.
Francis G. Gale
Percy W. Shaw
by Heard Smith & Tennant
Attys.

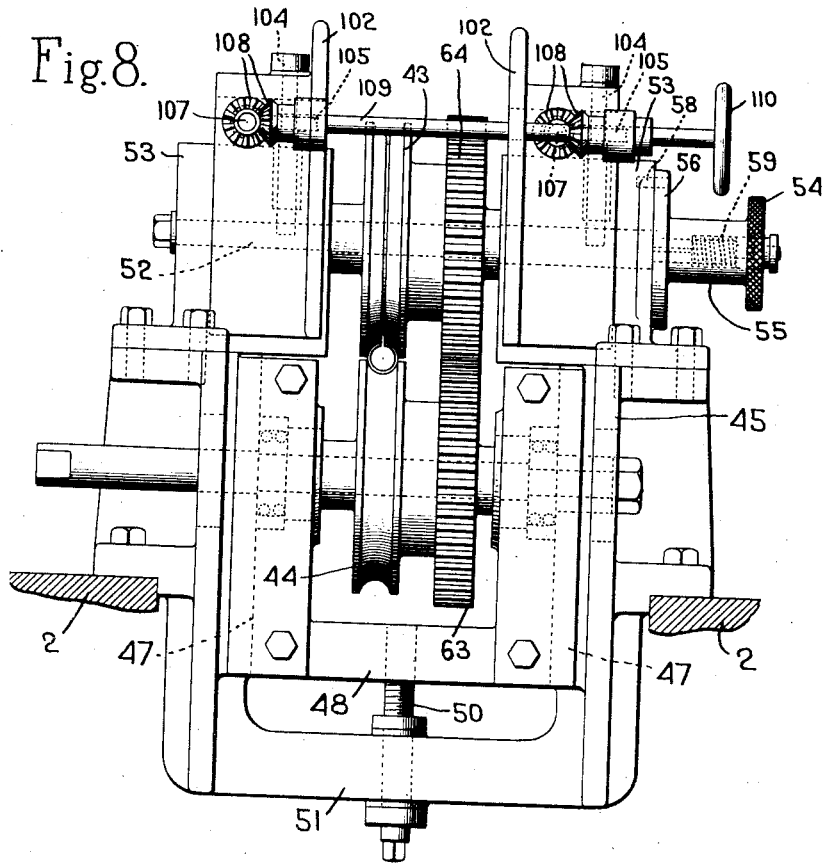
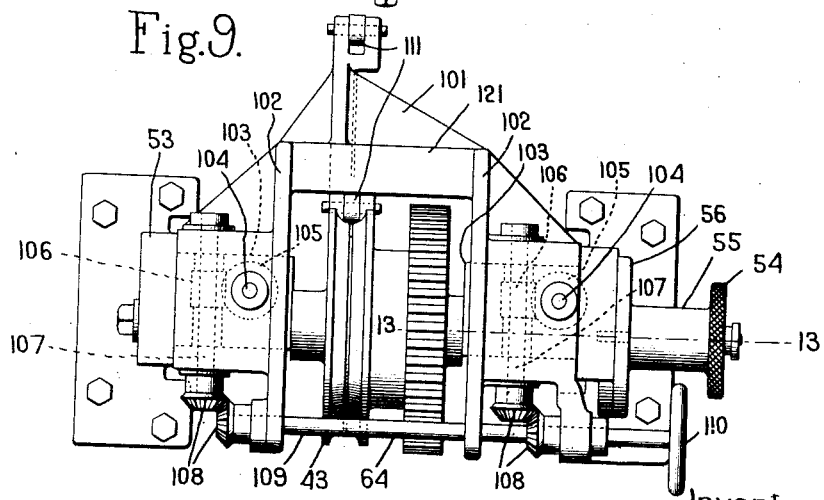

F. G. GALE AND P. W. SHAW.
TUBE WELDING MACHINE.
APPLICATION FILED AUG. 20, 1921.

1,434,885.

Patented Nov. 7, 1922.
9 SHEETS—SHEET 8.

Inventors.
Francis G. Gale
Percy W. Shaw
by Heard Smith & Tennant.
Attys.

F. G. GALE AND P. W. SHAW.
TUBE WELDING MACHINE.
APPLICATION FILED AUG. 20, 1921.

1,434,885.

Patented Nov. 7, 1922.
9 SHEETS—SHEET 9.

Inventors
Francis G. Gale
Percy W. Shaw
by Heard Smith & Tennant.
Attys.

Patented Nov. 7, 1922.

1,434,885

UNITED STATES PATENT OFFICE.

FRANCIS G. GALE, OF WATERVILLE, QUEBEC, CANADA, AND PERCY W. SHAW, OF LYNN, MASSACHUSETTS; SAID SHAW ASSIGNOR TO SAID GALE.

TUBE-WELDING MACHINE.

Application filed August 20, 1921. Serial No. 493,819.

*To all whom it may concern:*

Be it known that we, FRANCIS G. GALE, a subject of the King of Great Britain, residing at Waterville, Province of Quebec, Dominion of Canada, and PERCY W. SHAW, a citizen of the United States, and resident of Lynn, county of Essex, State of Massachusetts, have invented an Improvement in Tube-Welding Machines, of which the following description, in connection with the accompanying drawing, is a specification, like characters on the drawing representing like parts.

This invention relates to a machine for welding tubes which have been previously rolled into shape from skelps, and the general object of the invention is to provide an improved machine for this purpose which has various novel features and which is easy to manipulate.

The machine is of that type having a pair of contact rolls adapted to engage the tube to be welded either side of the seam and a pair of presser rolls acting against the side of the shaped tube at the welding point for the purpose of pressing closely together the abutting edges that are to be welded together.

One of the features of the present invention relates to an improved manner of supporting and feeding the tube by which it is possible to weld a tube of any desired length.

Still another feature of the invention relates to the manner of mounting the contact rolls so that they can be turned into different angular positions to fit different sizes of tubes.

Other features of the invention relate to the manner of mounting the various parts so that they can be readily adjusted to operate on tubes of different sizes.

Still another feature of the invention will be more fully hereinafter set forth and then pointed out in the claims.

In the drawings:

Fig. 8 is an end view of the feed rolls and their mounting.

Fig. 9 is a plan view of Fig. 8.

Figure 1:
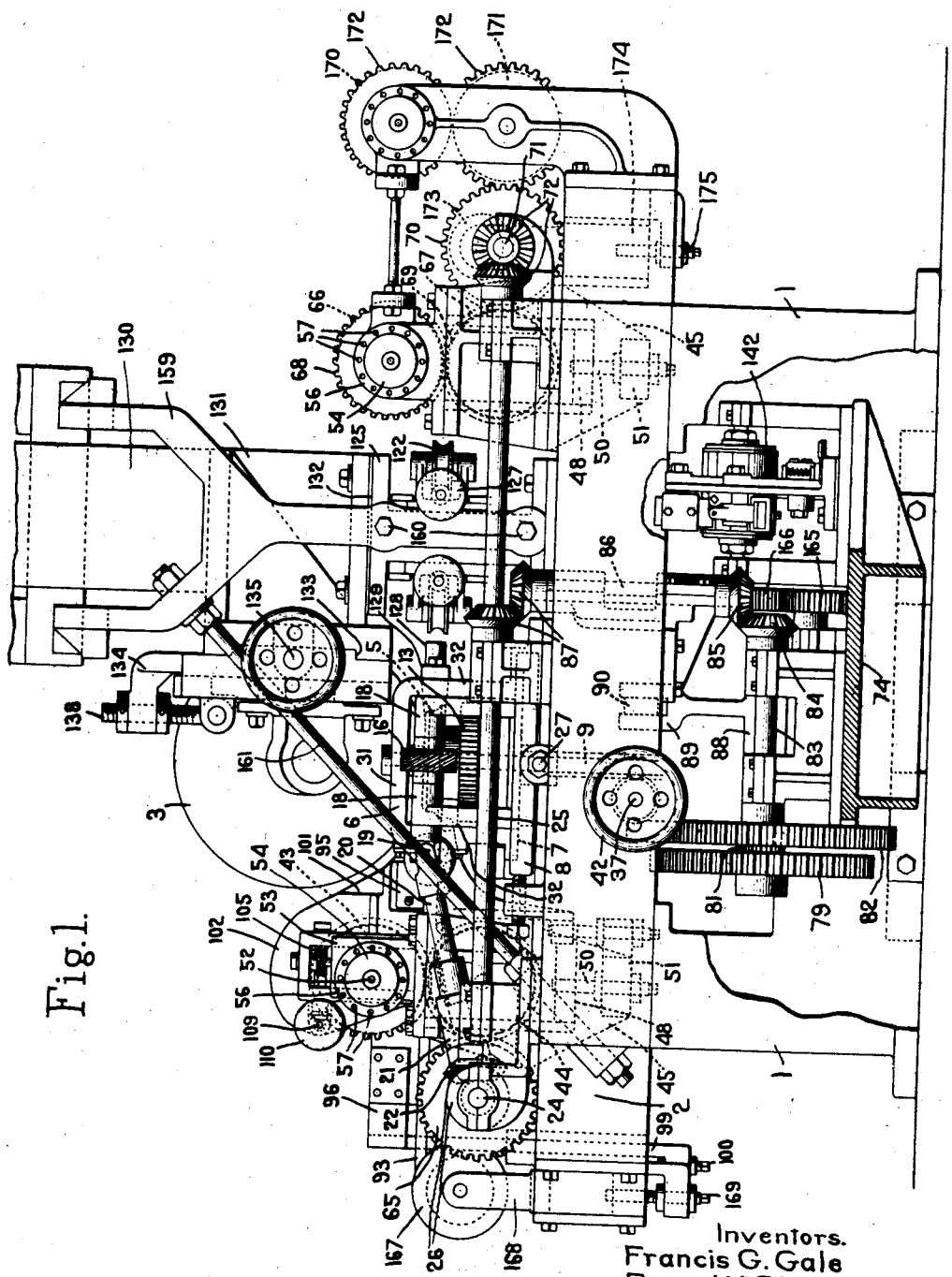
Fig. 1 is a side view of a welding machine embodying our invention.
Figure 2:
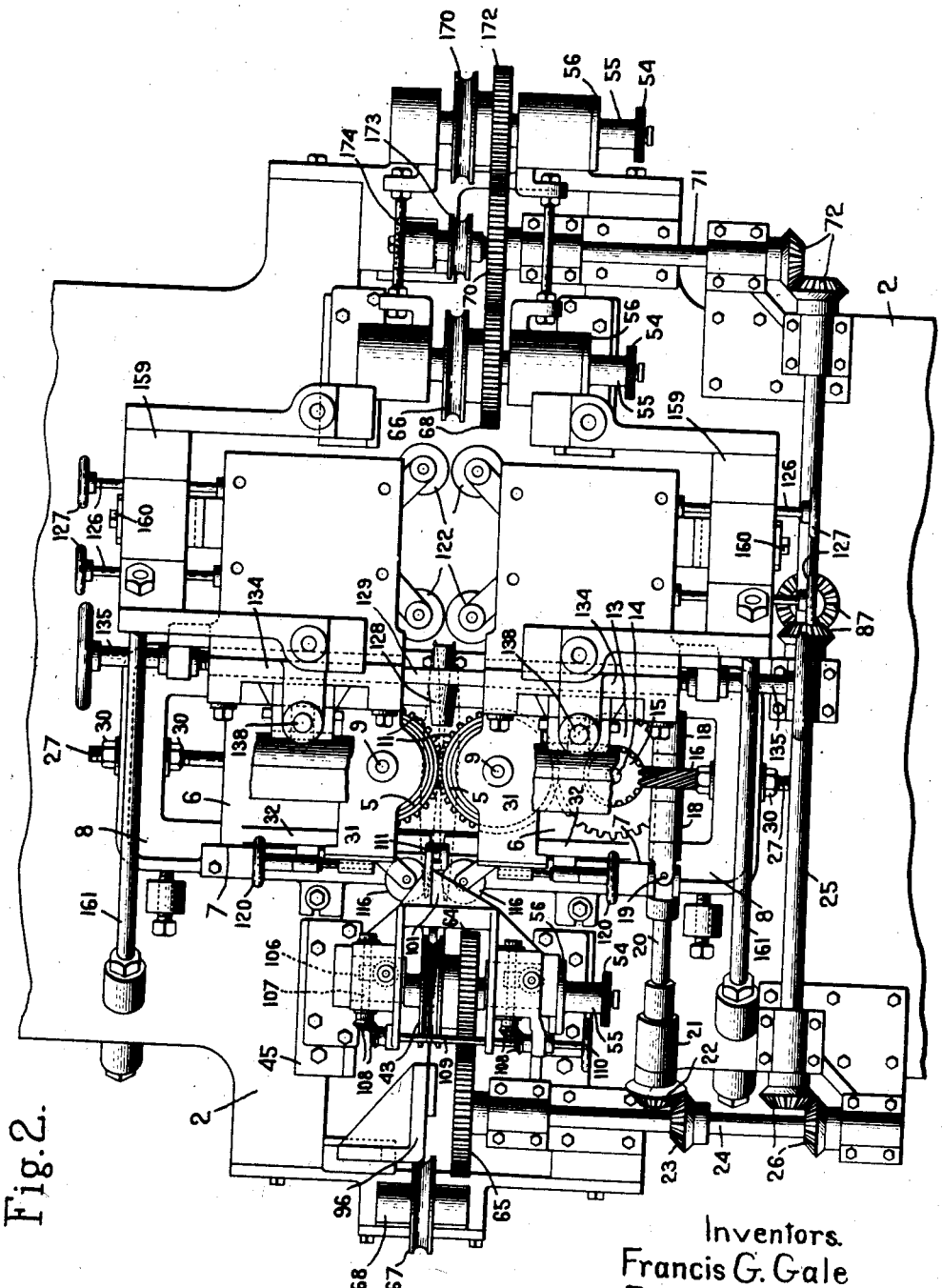
Fig. 2 is a top plan view.
Figure 3:
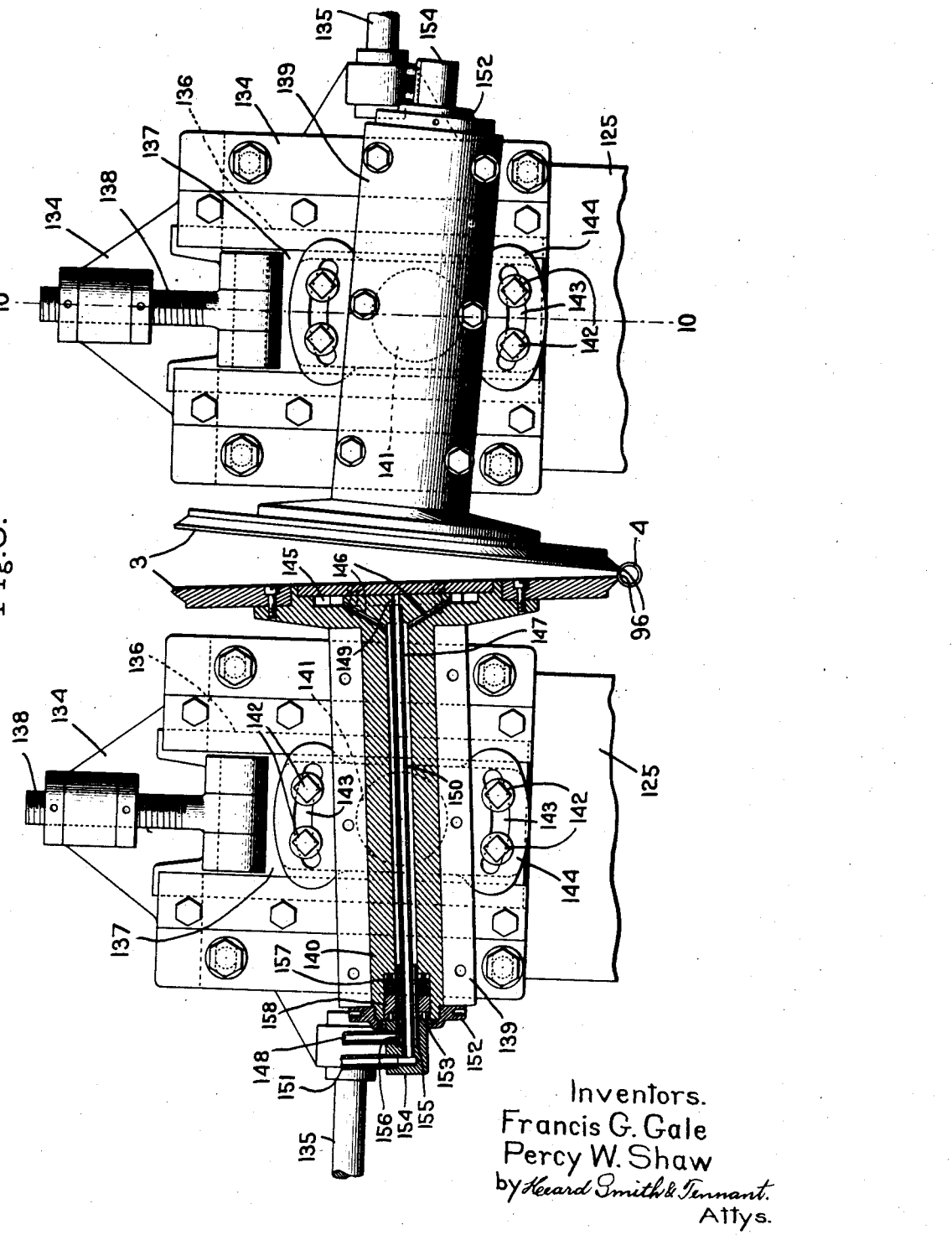
Fig. 3 is a view showing the contact rolls and their mounting, one of the rolls being shown in section.
Figure 4:
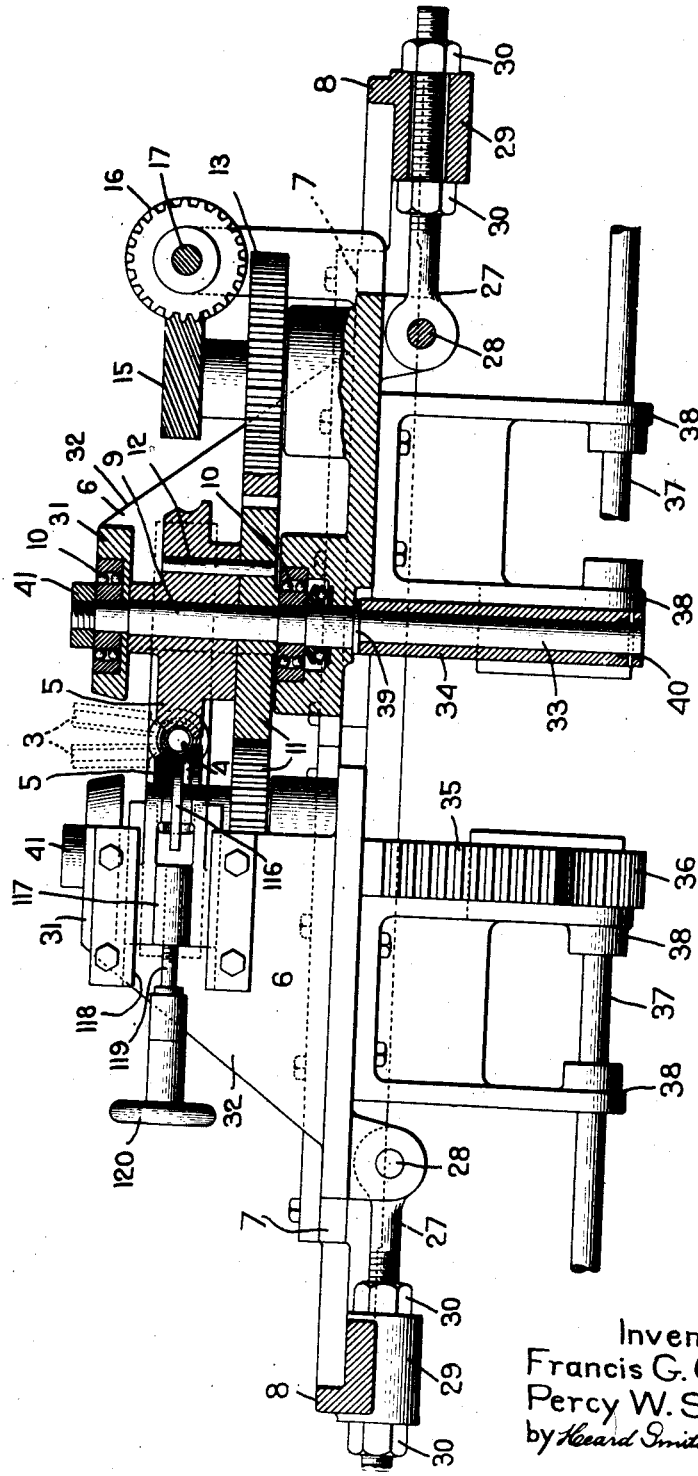
Fig. 4 is a view showing the presser rolls and their mounting, one of the rolls being shown in section.

The operative parts of the machine are supported on a suitable frame 1 which has as part of its structure a bed portion 2 that constitutes the support for the shaping rolls and the presser rolls.

The contact rolls by which the welding is done are shown at 3 and they have the usual disk form and are adapted to engage the side of the formed tube 4 to be welded at either side of the seam as shown in tube welding machines of this type. The presser rolls which engage the sides of the tube at the welding point are indicated at 5. These presser rolls are geared together so that they rotate in unison and are preferably positively driven so that they operate both as presser rolls and as feed rolls. Each presser roll is arranged to rotate about a vertical axis and is journalled in a support or carriage 6 which is received in ways 7 formed on a portion 8 of the frame. Each presser roll 5 is mounted on a vertical shaft 9 which is journalled in suitable bearings 10 formed in the carriage or support 6 and each roll also has rigid therewith a gear 11, said gears meshing with each other as shown so as to cause the rolls to operate in unison. The gears are illustrated as being connected to the rolls by means of pins 12. The gears 11 are positively driven and for this purpose one of said gears meshes with a gear 13 journalled on a stud 14 carried by one of the carriages 6, said stud having rigid therewith a spiral gear 15 which meshes with a spiral gear 16 on a shaft section 17 that is journalled in bearings 18 carried by the carriage 6. This shaft section is connected by a universal joint 19 to another shaft section 20 which is journalled in a bearing 21, and said shaft section 20 has a bevelled gear 22 thereon which meshes with and is driven by a bevelled gear 23 on a shaft 24 from which the shaping rolls are driven and which in turn is driven from a driving shaft 25 extending longitudinally of the machine by means of suitable bevelled gears 26.

The devices for driving the shaft 25 will be presently described.

Each carriage 6 is retained in its adjusted position in the ways 7 by means of an eye bolt 27 secured thereto at 28 and extending through a boss 29 formed on the portion 8 of the frame, each eye bolt having check nuts 30 thereon which engage the ends of the boss 29 and which not only hold the carriage rigidly in its adjusted position, but provide means by which the carriages may be adjusted toward and from each other.

Each carriage 6 is formed with the base portion receiving the lower bearing 10 and with the top portion 31 receiving the upper bearing 10 and with the sides 32 connecting the base, top and sides of each carriage forming an integral structure and the rolls 5 and gears 11 are situated within such structure.

In tube welding machines it is necessary to employ presser rolls 5 of different sizes and shapes, depending on size and shape of the tube to be welded, and in order to change the rolls 5 a construction is provided wherein the spindles or shafts 9 may be moved downwardly and withdrawn from the rolls, thus permitting the rolls to be moved laterally out from under the top portion 31 of the carriages. Each shaft 9 is formed at its lower end with an extension 33 which is journalled in a sleeve 34 situated below the carriage and having rack teeth 35 thereon which mesh with the teeth of a pinion 36 fast on a shaft 37 that is journalled in bearings 38 depending from the portion 8 of the frame. Each shaft has a collar 39 thereon engaging the under side of the lower bearing 10 and also a collar 40 at its lower end which engages the lower end of the sleeve so that the sleeve is confined between the two collars. Each shaft is held in place by the nut 41 on its upper end. Whenever the rolls 5 are to be changed, the nuts 41 are removed and the shafts 37 are turned thereby to act through the pinions 36 to lower the sleeves 34, this movement withdrawing the shafts from the rolls 5 thereby permitting said rolls to be removed. The shafts 37 are provided with hand wheels 42 at their ends by which they may be operated.

Situated in advance of the contact rolls 3 are a pair of feed rolls 43, 44 which are positively driven and which operate to feed the work to the welding point.

Situated in the rear of the contact rolls are another pair of feed rolls 66, 67 which operate on the welded tube and assist in feeding the tube through the machine.

Figure 6:
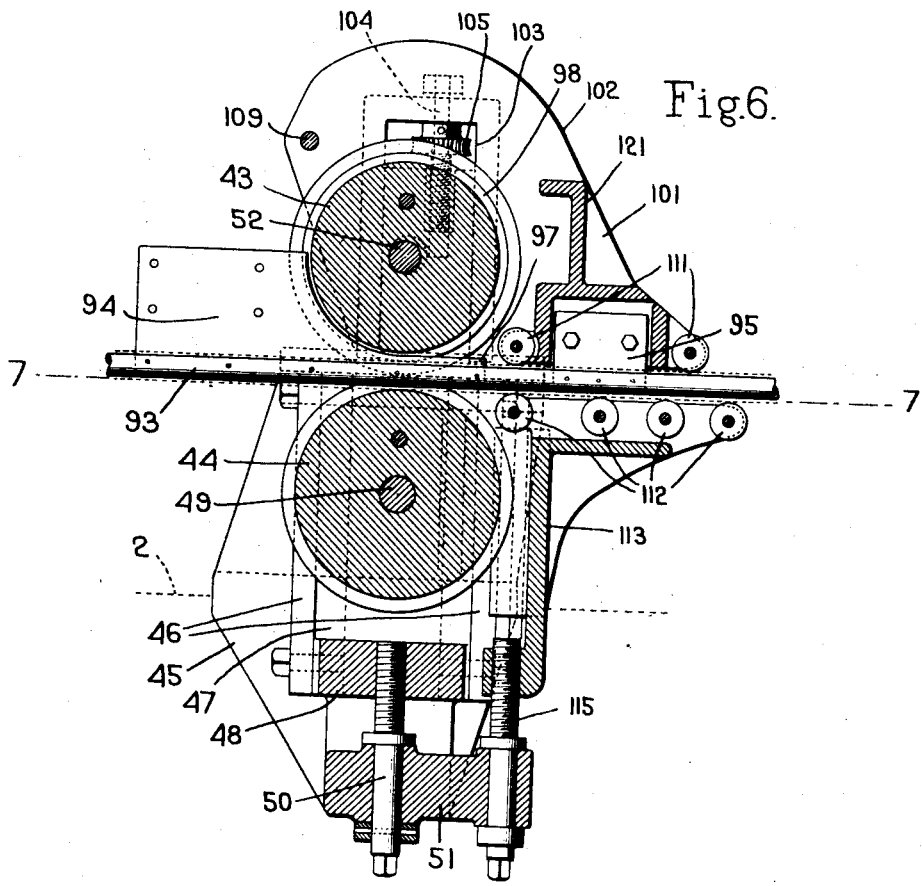
Fig. 6 is a vertical section through the first pair of feed rolls.
Figure 7:
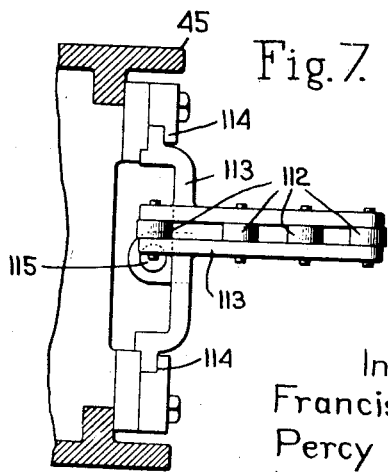
Fig. 7 is a section on the line 7—7, Fig. 6.
Figure 10:
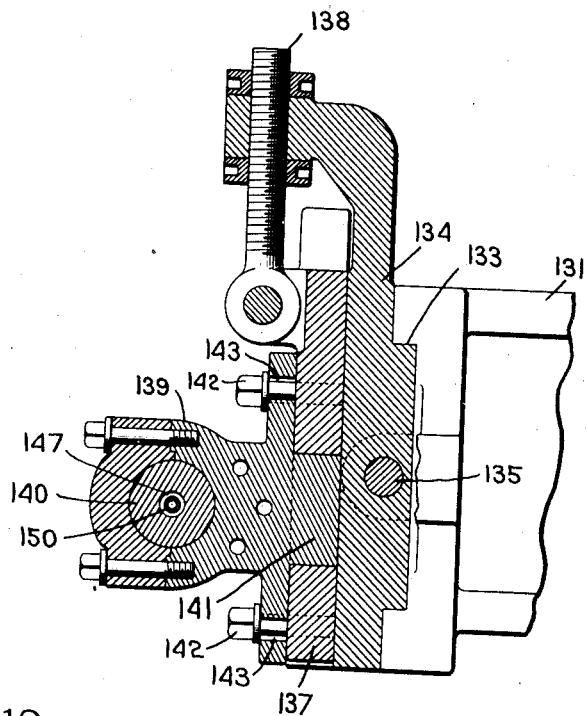
Fig. 10 is a section on the line 10—10, Fig. 3.

Both pairs of feed rolls are similarly constructed and mounted. The mounting for the feed rolls 43, 44 is perhaps best seen in Figs. 6 and 7. Secured to the bed 8 is a yoke-shaped frame 45, each arm of the yoke having vertical guide ways 46 therein in which a block 47 is mounted. The two blocks 47 are connected by a bridge piece 48 thus making a yoke-shaped structure and the feed roll 44 is carried by a shaft 49 which is journalled in the connected blocks 47.

The yoke-shaped structure 47, 48 is adjustable vertically in the ways 46 by means of an adjusting screw 50 which is screw-threaded in the bridge piece 48 and is swivelled in the bottom portion 51 of the frame 45.

The upper feed roll 43 is rotatable about a shaft 52 which is sustained at its ends in two blocks 53 that are secured to the frame 45. The portion of the shaft 52 on which the roll 43 is mounted is slightly eccentric as seen in Fig. 8 and said roll is adjusted vertically by turning the shaft 52. Said vertical adjustment of the rolls is for the purpose of accommodating tubes of different sizes.

Figure 13:
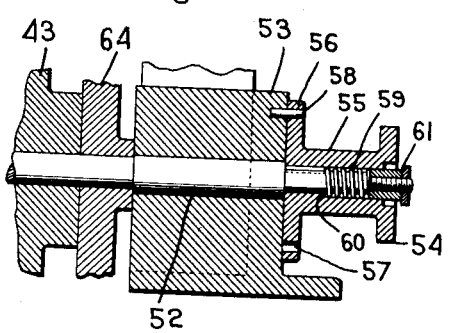
Fig. 13 is a section on the line 13—13, Fig. 9.
Figure 14:
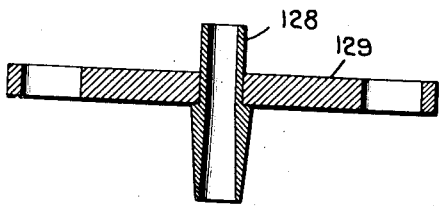
Fig. 14 is a section through the guide tube 128.

The shaft 52 is turned to effect the desired adjustment by means of a hand wheel 54 which is carried on a sleeve 55 that is splined to the shaft 52. This sleeve 55 has a flange 56 extending therefrom which is provided with a plurality of apertures 57, any one of which is adapted to receive a locking pin 58 carried by one of the blocks 53. This sleeve 55 is acted upon by a spring 59 which tends to hold it in its operative position but which permits it to be moved to the right Fig. 13 thereby to disengage the flange 56 from the pin 58. The spring 59 is confined between an internal shoulder 60 on the sleeve and a nut 61 screw-threaded to the reduced end 52 of the shaft. By drawing the sleeve 55 to the right it will be disengaged from the pin 58 and may then be turned to effect the desired adjustment of the feed roll 43 after which the sleeve may be locked in its adjusted position.

These feed rolls 43, 44 are positively driven. The feed roll 44 has a gear 63 rigid therewith and the feed roll 43 has a gear 64 rigid therewith, said gears meshing with each other. The gear 63 meshes with and is driven by a gear 65 fast on the shaft 24 which it will be remembered is driven from the shaft 25.

The rear feed rolls 66 and 67 are mounted similarly to the front feed rolls 43, 44 and are geared together by gears 68, 69 and the gears 69 of the feed rolls 67 meshes with and is driven by a gear 70 on a cross shaft 71 which is driven from the shaft 25 through suitable bevelled gears 72. The two pairs of feed rolls are thus driven in unison and at the same speed.

The driving shaft 25 may be rotated from any suitable source of power. In the construction shown, an electric motor 73 is mounted on a base or platform 74 situated beneath the bed plate 2. The shaft of this motor 73 has a pinion 75 thereon meshing with and driving a gear 76 on a shaft 77, and said shaft has a pinion 78 thereon which meshes with and drives a gear 79 carried by a short shaft 80. The gear 79 has rigid therewith a pinion 81 meshing with and driving a gear 82 on a shaft 83, said latter shaft having a bevelled gear 84 thereon which meshes with and drives the bevelled gear 85 on a vertical shaft 86 that is geared to the shaft 25 by means of bevelled gears 87.

Figure 11:
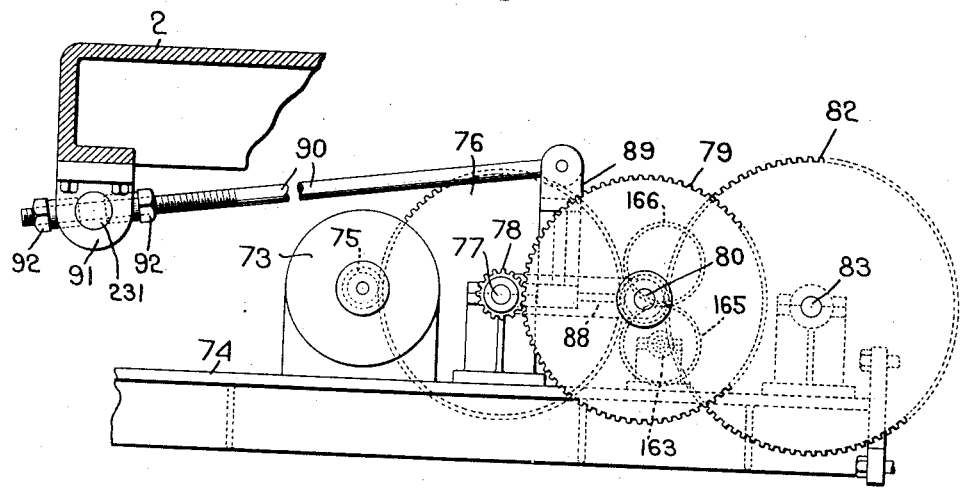
Fig. 11 is a view showing the driving mechanism.

In Fig. 11 a construction is shown by which the relative speed of the gears 79 and 82 can be changed thereby providing for varying the speed of the feed rolls 43 and 44, 66 and 67.

The short shaft 80 is journalled in an arm 88 which is mounted to swing about the shaft 77 and this arm has a lateral extension 89 to which is connected a link 90 that extends through a trunnion 231 mounted in a boss 91 depending from the bed plate 2, said link being screw threaded and having adjusting nuts 92 thereon situated either side of the trunnion. By adjusting these nuts the arm 88 can be turned about the shaft 77. As the arm 88 is moved upwardly the pinion 81 will be carried out of mesh with the gear 82 but the gear 79 will always remain in mesh with the pinion 78. The gears 79 and 81 are removable from the shaft 80 so that a pinion 81 of a larger size than that shown in the drawings may be used if desired. When such larger pinion is used then the arm 88 will have to be swung into position above that illustrated in Fig. 11.

The present machine includes in its construction suitable means for guiding the tube while it is being acted on by the feed rolls and for properly supporting the tube in its passage from the feed rolls to the contact rolls. The guiding means is such that it holds the tube from turning about its axis thus insuring that the seam or joint in the tube will be always properly presented to the contact rolls. This guiding of the tube to prevent it from being turned about its axis is secured by means of a mandrel 93 over which the tube passes and two supporting fins 94, 95 which are secured to the mandrel and by which it is supported. These fins are made of relatively thin sheet metal and as the tube is passed over the mandrel between the feed rolls the fins occupy the slot between the edges 96 of the tube that are to be welded together. The mandrel 93 is of considerable length and the fins 94 and 95 are situated at the ends of the mandrel and these fins serve to hold the tube from turning about its axis and keep the tube always with the joint to be welded in line with the contact rolls. The fin 94 is secured to a support 96 situated in front of the rolls 43 and 44 and said fin is provided with the extension 97 which is situated between the rolls, the roll 43 being provided with a peripheral groove 98 to receive such extension.

The mandrel 93 is made adjustable at each end and this is accomplished by adjustably mounting the fins 94 and 95. The support 96 for the fin 94 is provided with a depending arm 99 which is capable of vertical movement in suitable ways formed in the bed 2. The lower end of the arm 99 has an adjusting screw 100 which is screw-threaded into the bed, as seen in Fig. 11, so that by turning the adjusting screw the fin 94 can be raised and lowered.

The fin 96 is secured to a yoke-shaped frame 101 which is mounted for vertical adjustment. This frame is provided with two cheek pieces 102 which are situated on either side of the feed roll 43 and each cheek piece has a guide way 103 therein which fits over and is guided by one of the blocks 53. Each cheek 102 of the frame has swivelled therein an adjusting screw 104 which screw threads into the corresponding block 53 and each adjusting screw has fast thereon a worm 105 which meshes with a worm gear 106 on a shaft 107 carried by an extension formed on the cheek piece. Each of the shafts 107 is connected by bevelled gears 108 to a guiding shaft 109, the latter having a hand wheel 110 thereon by which it may be turned. The turning of the shaft 109 will operate to raise and lower the frame 101 thereby raising or lowering the fin 95.

In introducing a formed tube into the machine said tube is placed over the end of the mandrel 93 with the seam in the tube in line with the fins and as the tube is passed between the feed rolls 43, 44 the fins guide the seam of the tube. These fins are made of very thin stock so that they do not open the seam to any appreciable extent but they do hold the tube from twisting and maintain it in proper position so that the seam will always be correctly aligned with the contact rolls.

In operating a tube welding machine of this type it is desirable that the operater should have at all times a good view of the work at the welding point and with the present machine this end is secured by reason of the shape of the support for the feed rolls 43. While the member 101 is constructed with two side pieces or cheeks 102 yet the portion 121 which connects the two cheek pieces is so constructed that it is below the level of the top of the feed roll 43 and so that it does not obstruct the view of the welding operation. This is a feature which we regard as of considerable importance.

The mandrel 93 will preferably be somewhat smaller than the interior diameter of the tube 4 and to properly guide the tube as it passes from the feed rolls to the contact rolls a plurality of guide rolls are employed. There are two such guide rolls 111, carried by the frame 101 and operating on the upper side of the tube.

There is another set of guide rolls 112 which operate on the under side of the tube and which are shown as carried by a bracket 113 which is slidably mounted in ways 114 formed on the frame 45. This bracket is adjusted vertically and held in proper adjustment by an adjusting screw 115 which has screw-threaded connection with the bracket and is swivelled in the portion 51 of the frame.

The guide rolls hold the tube in proper position vertically and the fins 94, 95 prevent the tube from turning about its axis and by this means the formed tube will be correctly guided to the contact rolls when it is introduced into the machine.

In addition to the above-described guiding means for the tube there is also provided two guide rolls 116 which are adapted to engage the side of the tube between the feed rolls and the contact rolls. Each of these guide rolls 116 is journalled in a carriage 117 mounted in guide ways 118 formed on the carriage 6 and each of these carriages 117 is adjusted in its ways by means of an adjusting screw 119, each adjusting screw having a hand wheel 120 by which it may be operated.

Figure 5:
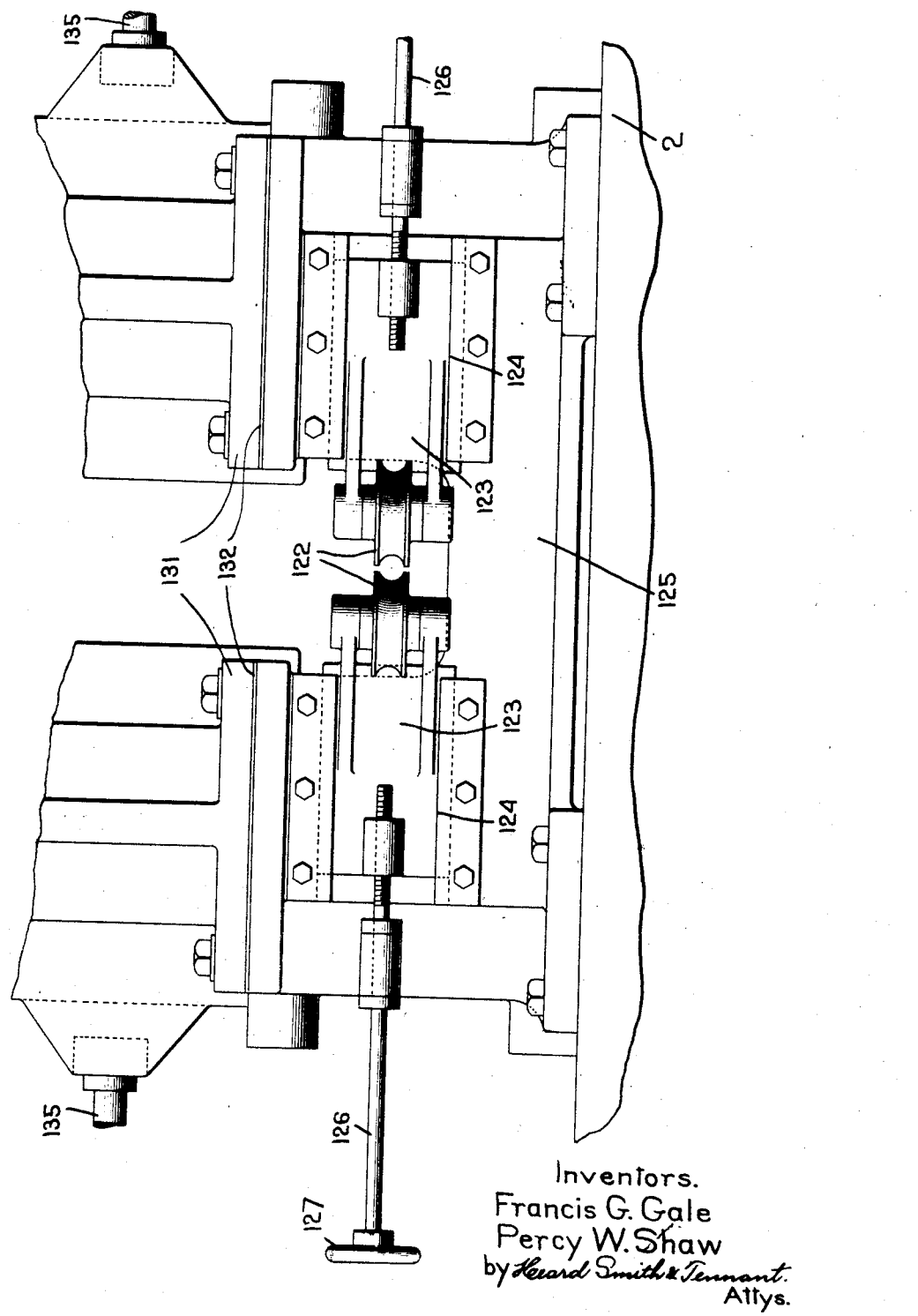
Fig. 5 is a view of the support for the transformer.

The machine is also provided with other guide rolls 122 situated to act on the sides of the tubes between the contact rolls and the rear feed rolls 66, 67. These guide rolls 122 are carried by slides 123 which are adjustable in ways 124 on a portion 125 of the frame. Each slide receiving its adjustment from an adjusting screw 126 which is operated by a hand wheel 127. This construction is best shown in Fig. 5. With this arrangement of guiding the tube a formed tube of any desired length can be introduced into the machine by inserting it over the mandrel, and as the tube is carried through the machine it is properly guided so that the welding will be correctly done and it is delivered from the machine as a completely welded tube. The length of the tube is immaterial and a very long tube can be operated on equally as well as a short tube. To assist in guiding the tube from the contact rolls and presser rolls to the guide rolls 122 a tubular guide member 128 is employed which is secured to a cross bar 129. This tubular guide member 128 has a tapered bore with the larger end directed toward the contact rolls so that as the tube is delivered from the contact and presser rolls said tube will enter the larger end of the guide 128 and as the tube passes into the smaller end it will be positioned correctly to be received by the guide rolls 122.

The transformer, which may be of any suitable construction, is indicated generally at 130 and it is supported by a two part head member 131, each part being secured to one of the supports 125 of the frame, said head member sections being insulated by suitable insulations 132. This head 131 also supports the contact rolls 3 and said rolls are mounted on the support so that they can be adjusted both transversely and vertically.

Each head member section 131 is provided with ways 133 in which is slidably mounted a carriage 134, said carriage being adjustable horizontally in said ways by means of an adjusting screw 135. Each carriage 134 is provided with vertical ways 136 in which is received a slide 137, that is vertically adjusted in said ways by means of an adjusting screw 138 swivelled to the carriage 134.

Each slide 137 carries a bearing 139 in which a contact roll is journalled. Each contact roll is provided with a spindle or shaft portion 140 which is journalled in the bearing 139. The bearings 139 are mounted on the carriages 137 so that the angular position of the bearings may be changed and this is accomplished by providing each bearing with a trunnion 141 which is journalled in the slide 137, said trunnion constituting an axis about which the bearing may be turned. The bearings are held in their adjusted position by clamping screws 142 which extend through slots 143 formed in flanges 144 extending from the bearings, said screws being screw-threaded into the slide 137.

The lateral movement of the carriages 134 provide for adjusting the contact rolls toward and from each other. The vertical movement of the slides 137 provide the necessary vertical adjustment of the contact rolls to accommodate tubes of different sizes and the swivelling adjustment of the bearings 139 provide for changing the angular position of the contact rolls. This change of angular position is important because it provides for adjusting the rolls so that the contact rolls will always have a proper bearing against the tube 4 regardless of the size of the tube.

Means are provided for maintaining the contact rolls cool by the circulation of a cooling medium through suitable chambers in the rolls. Each roll is provided with an annular chamber 145 which communicates through ducts 146 with a passage 147 extending axially of the spindle, the outer end of said passage having connection with a circulating pipe 148. The chamber 145 also communicates through ducts 149 with a pipe or conduit 150 situated within the passage 147 and communicating at its outer end with another circulating pipe 151. These circulating pipes 148 and 151 are so constructed that a cooling medium may be introduced through one of said pipes into the chamber 145, and may be led from said chamber through the other of said pipes.

In order to provide for the continuous circulation of the cooling medium while the contact rolls are rotating, the end of each shaft 140 projects slightly beyond the bearing 139 and has a flanged collar 152 screwed thereto, the flange of said collar overlying a flange 153 on a stationary head piece or manifold 154 to which the circulating pipes 148 and 151 are connected. This stationary head piece or manifold 154 has a tube 155 rigidly secured thereto, the end of which fits the outer end of the passage 147 and which forms a continuation of said passage, said tube 155 having a port 156 which communicates with the tube 148. To make a tight joint and prevent the water from leaking around the tube 155, the outer end of the shaft 140 is counterbored to receive a packing 157 which is held in place by a gland 158 screwed into the end of the shaft. The outer end of the tube 150 is journalled in the manifold 154, the latter being provided with suitable passages forming a communication between the tube 150 and the pipe 151.

With this arrangement there is always free communication between the pipes 148 and 151 and the chamber 145, notwithstanding the rotary movement of the contact wheels.

In order to steady the transformer and help support it two brace members 159 are employed which are secured by means of bolts 160 to the end of the supporting portions 125. These brace members 159 are braced by means of brace rods 161 which connect said members to the front end of the frame. It will be noted that the contact rolls 3 are not only supported by the portions 125 of the frame but are situated considerably in advance thereof and the brace rods 161 serve to stiffen the frame structure and to support this overhanging weight.

Figure 12:
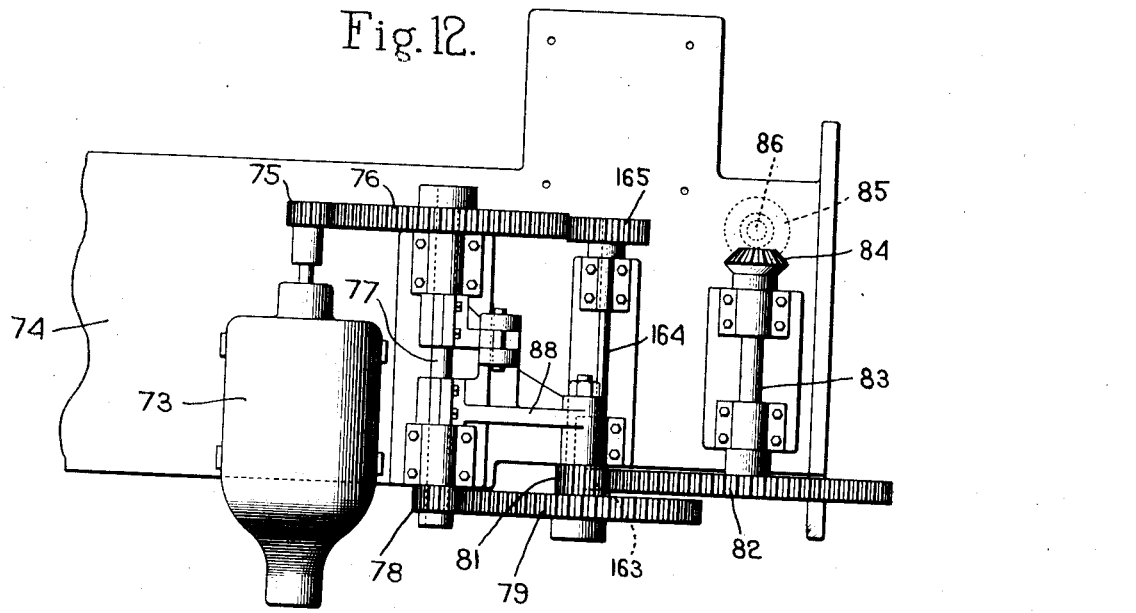
Fig. 12 is a plan view of Fig. 11.

142 is an interrupter connected in the circuit of the transformer and designed to make and break the circuit in rapid succession. Any suitable interrupter may be employed, such for instance, as shown in United States Patent No. 1,349,303, August 10, 1920. This interrupter comprises a rotary armature constructed so that as it rotates the circuit is made and broken in rapid succession. The interrupter is driven from the gear 82, shown in Fig. 12. For this purpose, said gear meshes with a pinion 163 on a transverse shaft 164 and said shaft has a gear 165 thereon which meshes with and drives a gear 166 on the interrupter shaft.

167 indicates a supporting roll situated in front of the feed rolls 43 and 44. This roll is mounted on a support 168 which is slidable vertically in the bed 2 and is held in adjusted position by an adjusting screw 169.

There is sometimes a tendency for the welded tube to curl or bend slightly as it is delivered from the machine and in order to obviate this the present machine is provided with means for acting on the tube after it is welded for the purpose of straightening the latter. Said means comprises a pair of straightening rolls 170, 171 which are situated to the rear of the feed rolls 66, 67 and which are positively driven.

The straightening rolls 170, 171 are geared together by suitable gears 172 and one of the gears meshes with and is driven by the gear 70 that drives the rear feed rolls 66, 67. 173 is a roll situated to have the tube pass over it and said roll is mounted on a support 174 which is adjustably mounted in the frame and the position of which may be adjusted by an adjusting screw 175. This roll will be adjusted so that it is slightly above the rolls 67 and 171 and therefore as the tube passes over the rolls 173 and between the rolls 170, 171 it will be bent downwardly slightly thereby counteracting the tendency of the tube to curl upwardly due to the welding operation.

We claim.

1. In a tube welding machine, the combination with a pair of contact rolls, of a pair of feed rolls situated in advance of the contact rolls, a mandrel over which the tube is fed, said mandrel extending from one to the other side of the feed rolls and a fin for supporting each end of the mandrel, said fins being adapted to pass through the joint of the tube as the latter is fed.

2. A tube welding machine such as claimed in claim 1 having means for adjusting the fins independently.

3. A tube welding machine such as claimed in claim 1 having one of the fins extending between the rolls.

4. A tube welding machine such as described in claim 3, in which one of the feed rolls is grooved to receive the fin which extends between the rolls.

5. In a tube welding machine, the combination with means to support the tube to be welded, of contact rolls, and means for supporting the latter constructed to permit the relative angular position of said rolls to be varied.

6. In a tube welding machine, the combination with means to support a tube to be welded, of contact rolls, a bearing in which each contact roll is journalled, a carriage to which each bearing is swivelled to permit the relative angular relation of the contact rolls to be varied, and means to adjust the carriage.

In testimony whereof, we have signed our names to this specification.

FRANCIS G. GALE.
PERCY W. SHAW.